Oct. 9, 1934.  H. R. ISLER ET AL  1,975,947
MACHINE TOOL
Filed Sept. 28, 1929  5 Sheets-Sheet 1

Inventor
HERMAN R. ISLER
SOL EINSTEIN
By H H Parsons
Attorney

Oct. 9, 1934.    H. R. ISLER ET AL    1,975,947
MACHINE TOOL
Filed Sept. 28, 1929    5 Sheets-Sheet 2

Inventor
HERMAN R. ISLER
SOL EINSTEIN
By  HR Parsons
Attorney

Oct. 9, 1934.  H. R. ISLER ET AL  1,975,947
MACHINE TOOL
Filed Sept. 28, 1929   5 Sheets-Sheet 3
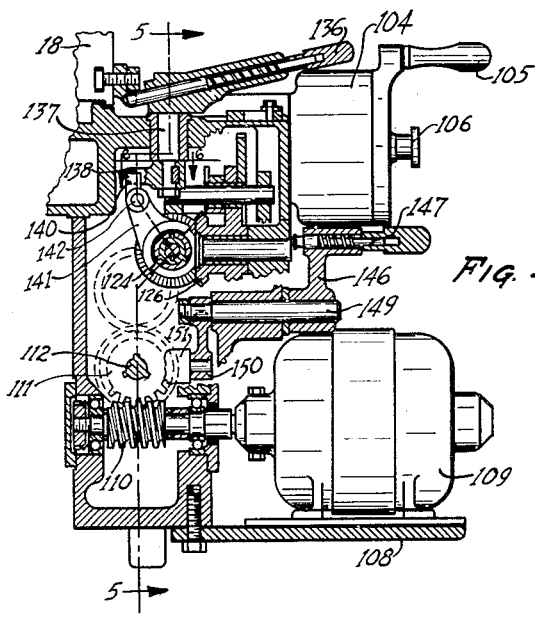
FIG. 4
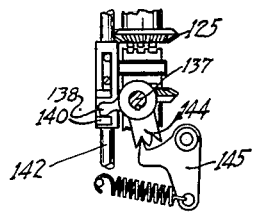
FIG. 6
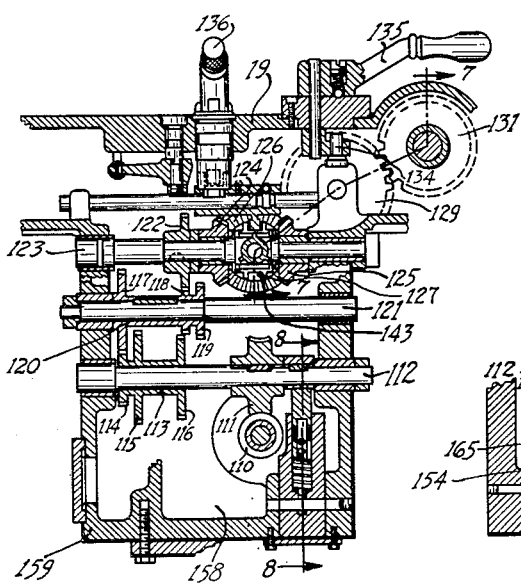
FIG. 5
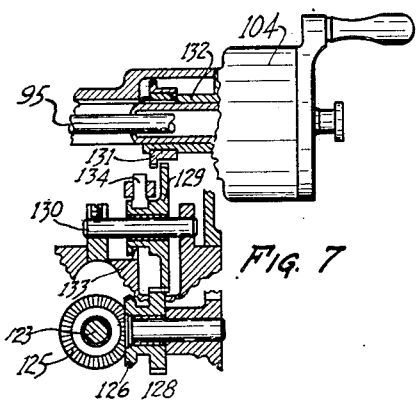
FIG. 7
FIG. 8
Inventor
HERMAN R. ISLER
SOL EINSTEIN
By A. K. Parsons
Attorney Oct. 9, 1934.　　H. R. ISLER ET AL　　1,975,947
MACHINE TOOL
Filed Sept. 28, 1929　　5 Sheets-Sheet 4

Inventor
HERMAN R. ISLER
SOL EINSTEIN
By AHKParsons
Attorney

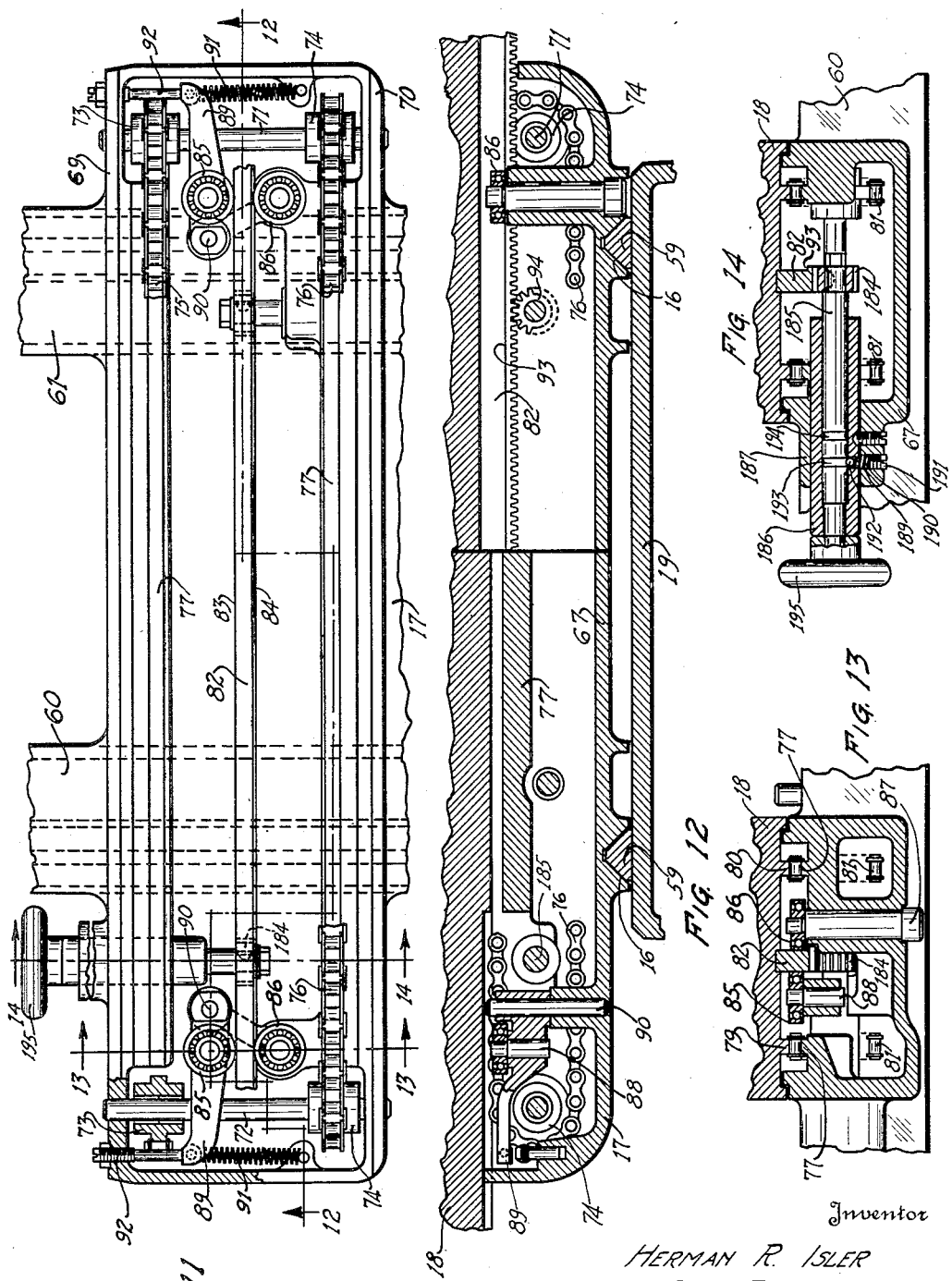

Patented Oct. 9, 1934

1,975,947

UNITED STATES PATENT OFFICE 1,975,947

MACHINE TOOL

Herman R. Isler and Sol Einstein, Cincinnati, Ohio, assignors to The Cincinnati Milling Machine Company, Cincinnati, Ohio, a corporation of Ohio Application September 28, 1929, Serial No. 395,962

21 Claims. (Cl. 51—225)

This invention relates to improvements in grinding machines and especially to improvements in cutter grinders.

An object of this invention is to provide in a device of this type improved and more efficient mechanism to reduce friction and wear on the parts, as well as to provide a device having a more universal use.

Another object of this invention is to provide in a device of this type improved novel construction whereby the parts may be manually or power operated.

A further object of the invention is to provide in a device of this type an improved novel anti-friction mounting for the movable work supporting table thereof.

Further objects and advantages of the present invention should be readily understood by referring to the following specification, considered in conjunction with the drawings forming a part thereof, and it is to be understood that any modifications may be made in the exact structure hereinafter described, within the scope of the appended claims, without departing from or exceeding the spirit of the invention.

In the drawings:

Figure 4 is a sectional view through the power drive mechanism taken on line 4—4 of Figure 1.

Figure 5 is a sectional view showing in development the power drive as seen from line 5—5 of Figure 4.

Figure 6 is a plan view of the locking mechanism employed in connection with the reversing mechanism.

Figure 7 is a sectional view on line 7—7 of Figure 5.

Figure 8 is a sectional view on line 8—8 of Figure 5, illustrating a feed lubricating pump.

Figure 11 is a fragmentary plan view of the saddle with the table removed, showing the rack bar in position.

Figure 12 is a longitudinal sectional view through the saddle and table, as seen from line 12—12 of Figure 11.

Figure 13 is a transverse sectional view of the saddle and table as seen from line 13—13 of Figure 11.

Figure 14 is a transverse sectional view similar to Figure 13, taken on line 14—14 of Figure 12.

Throughout the several views of the drawings, similar reference characters are employed to denote the same or similar parts.

Figure 1:
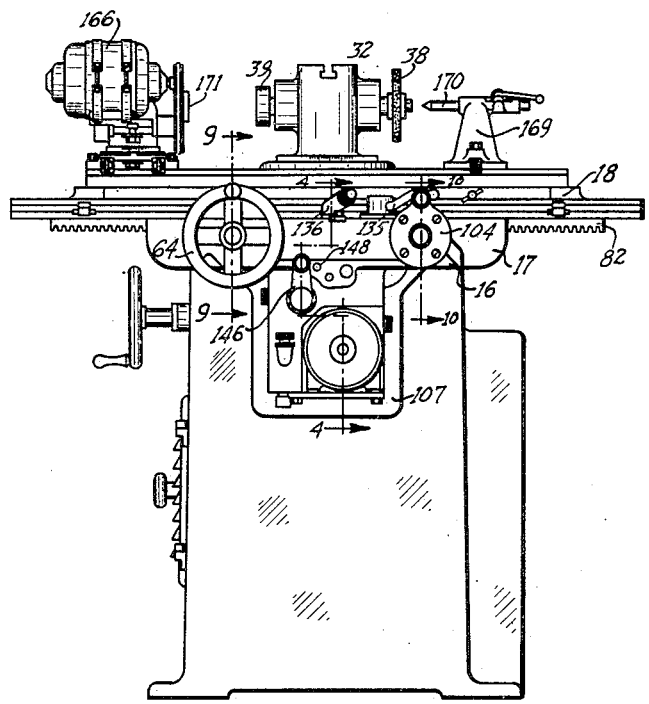
Figure 1 is a front elevation of the improved device of this invention.
Figure 2:
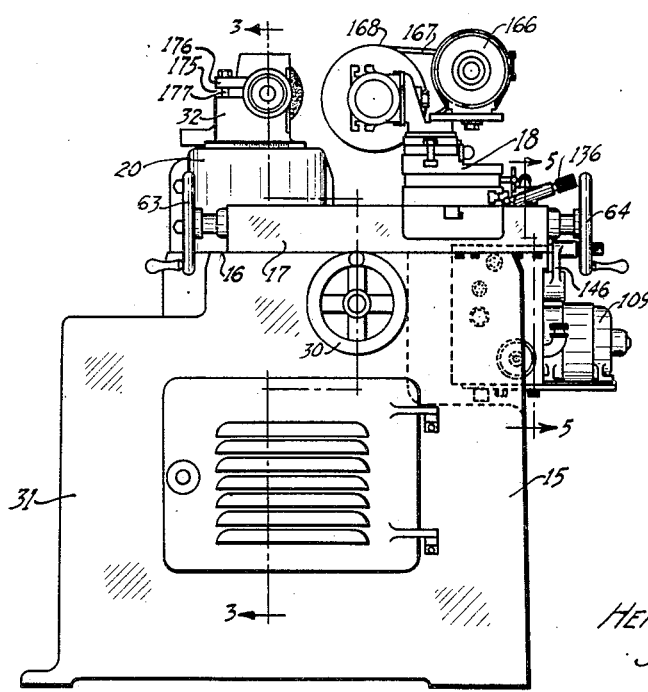
Figure 2 is a side elevation of the device shown in Figure 1, as seen from the lefthand side thereof.

The numeral 15 designates a hollow box-like bed being provided on its upper surface with suitable ways 16 for supporting and guiding a saddle 17. The saddle 17, in turn, supports for reciprocating movement a work supporting table 18 adapted to be reciprocated transversely of the bed. The bed 15 is provided with a hollow interior and a top plate 19 closing the upper end of the bed.

A tubular guide sleeve or column 20 having fastening lugs 21 is provided, being secured to the top plate 19 by suitable bolts or other fastening means 22 and depending within the hollow interior of the said bed. Vertically shiftable through the column 20 is a sleeve 23 provided on its one side with a rack 24 enmesh with a pinion 25 carried by a stub shaft 26. Shaft 26, in addition has secured thereto, so as to move therewith, a worm wheel 27 adapted to be driven or rotated by a worm 28 on the end of worm shaft 29. A hand wheel 30 is mounted on the end of shaft 29 and extends beyond the side wall 31 of the bed 15. The sleeve 23 is provided interiorly thereof with a second sleeve 41 adapted to be oscillated relative to its supporting sleeve 23 but moves vertically therewith.

Sleeve 41 is provided on its upper end with a spindle housing 32, through which a spindle 33 extends, and at its base with a flange 42 adapted to abut the upper edges of sleeves 23 and 41. The spindle 33 is journaled near the opposite end in anti-friction bearings carried by bosses or the like 34 protruding sidewise from the spindle housing 32. The bosses or sleeves 34 extending laterally from the spindle housing are split, as at 175, and are provided on one side thereof with a lug or ear 176. A clamp bolt 177 extends through this ear or lug into the spindle housing 32 for drawing the said ear or lug 176 toward the housing and clamping in position a bearing sleeve 178, in which the anti-friction bearings 179 are mounted. These anti-friction bearings abut on one side with an annular shoulder 180 extending inwardly of the sleeve 178 and the bearings are clamped in position by a nut 181 threaded into the opposite ends of the sleeves 178. The ends 35 and 36 of the spindle 33 are formed alike, each having a tapered portion for receiving the usual collet and collar 37, whereby a grinding wheel may be secured to the said ends 35 and 36 of the spindle. It is to be understood that any type of grinding wheel may be secured to either or both ends of the spindle but, as here shown, the righthand end of the spindle has secured to it a disc-shaped grinding wheel 38, while the lefthand end carries a belt pulley 39. The belt pulley 39 is generally employed for rotating an internal grinding attachment (not shown) which is adapted to be mounted on the table 18. The spindle 33 is further provided between its opposite ends and interiorly of the hollow spindle housing 32 with a pulley 40, either secured thereto or integral therewith, about which a transmission belt 43 extends. From the foregoing it will be noted that the spindle 33, pulley 40 and anti-friction bearings 179 are formed into a unit, and like a cartridge, may be placed in and removed from the spindle housing in a unit. In the event it is necessary or desirable to remove this spindle, for example when replacing the transmission belt or for repairing the spindle, it is only necessary to loosen the clamp bolts 177, when the spindle may be removed as an entirety.

Figure 3:
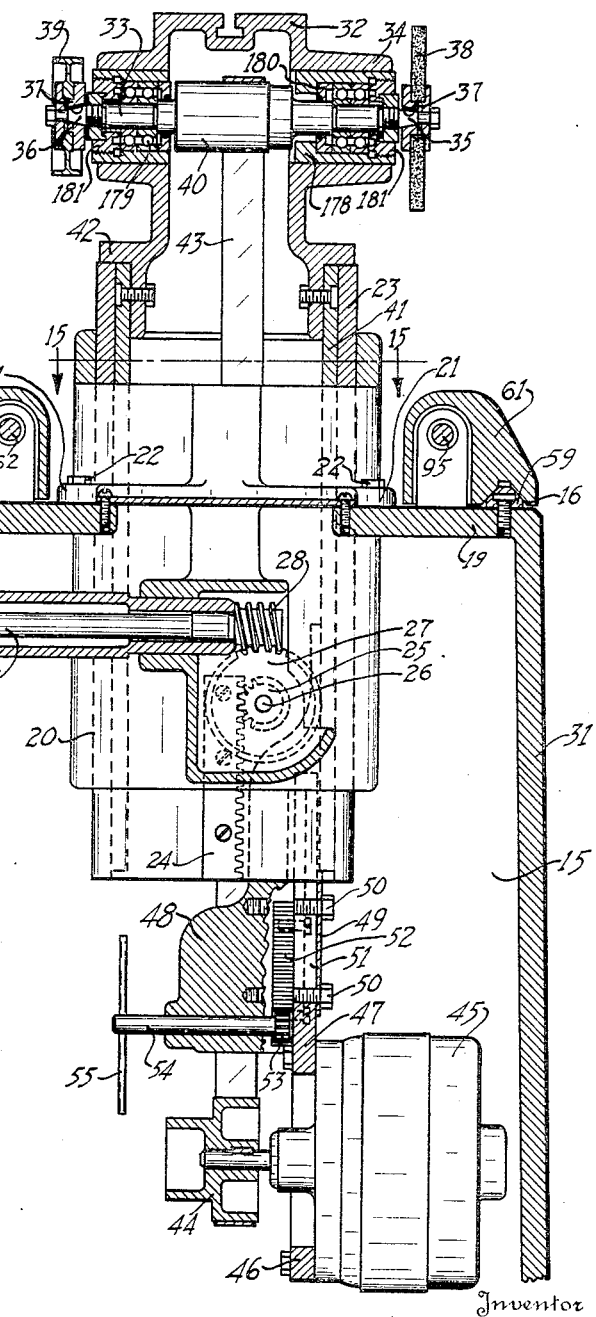
Figure 3 is a vertical sectional view, as seen from line 3—3 of Figure 2.

The transmission belt 43 which passes around pulley 40 extends downwardly through the hollow interior of the oscillatable sleeve 41 to and around a cone pulley 44, here illustrated as a two step cone, carried by the motor or prime mover 45. The motor 45 is secured to a yoke 46, which has a tongue 47 extending therefrom and in sliding engagement with a projection 48 carried upon and depending from the sleeve 41. A guide plate 49 is carried by the arm 48 and is positioned on the other side of the tongue 47 and has suitable clamp bolts 50 extending therethrough, as well as through an elongated perforation 51 formed in the tongue 47. The tongue 47 is further provided with a rack bar 52, the teeth of which are enmesh with the pinion 53 on the end of the stem 54. An actuating handle or lever 55 is secured in the end of the stem 54 for rotating the pinion 53 and slidably adjusting the yoke 46 and motor 45 carried thereby. As shown in Figure 3, the transmission belt 43 extends about the larger portion of the cone pulley 44. If, however, it is desired to drive the spindle at a slower speed, the belt would be shifted to the smaller pulley, which would necessitate the motor 45 being lowered to take up the slack that would then exist in the belt. This slack would be taken up by loosening the clamp bolts 50 and rotating the pinion 53 by means of the lever 55 in the proper direction to lower the said motor 45 to obtain proper tensioning of the belt 43. In this connection, it will be noted that pulley 40 has a relatively long face to align itself with either the larger or the smaller pulley of the cone 44. To permit this adjustment of the motor for properly tensioning the belt, the side wall 31 is provided with an opening 182 normally closed by a louvre formed door 183.

From the foregoing description, it will be noted that the bed 15 and table 18, carried thereby, are of a fixed height and are not adjustable vertically or horizontally, as was the practice in most structures prior to this time, and that all vertical and horizontal adjustments between the axis of the spindle 33 and tools carried thereby and the table 18 are accomplished by vertically raising and lowering the said spindle and tools and by the oscillation thereof. This vertical adjustment of the spindle is accomplished by the hand wheel 30 through the shaft thereof which carries the worm 28 meshing with the worm gear 27 and rotation of which worm 28 causes a similar rotation of pinion 25, thereby raising and lowering the rack 24 and sleeve 23 to which the rack is secured. It will be noted that if the sleeve 23 be raised or lowered, the spindle housing 32 and oscillatable sleeve 41 to which the housing is secured, will move therewith because of the engagement of the flange 42 of the housing with the sleeve 23. It will also be noted that while sleeve 41 is vertically adjusted with sleeve 23, it is nevertheless independent of sleeve 23 and may be oscillated relative to said sleeve 23. This oscillation of the sleeve 41, which may be accomplished by grasping the sleeves 34 and exerting a push or pull thereon, carried with it the motor 45 and associated mechanisms and, since the sleeve 41 is hollow, an open straight drive between the spindle and motor is insured.

Figure 15:
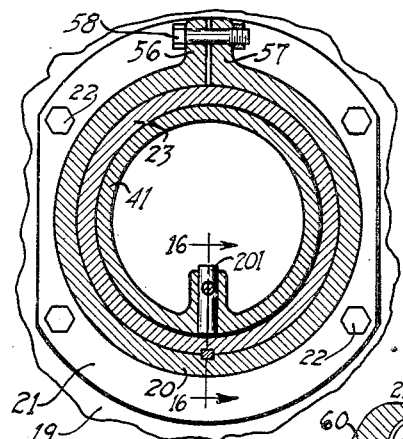
Figure 15 is a sectional view taken on line 15—15 of Figure 3.
Figure 16:
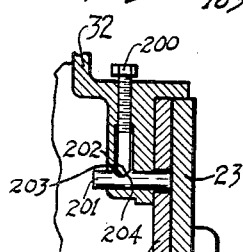
Figure 16 is a sectional view taken on the line 16—16 of Figure 15.
Figure 9:
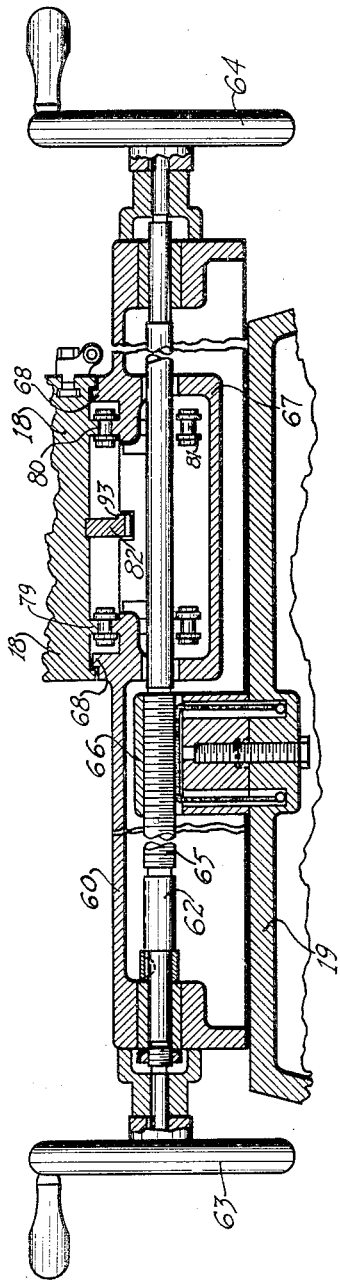
Figure 9 is a sectional view on line 9—9 of Figure 1, illustrating the means for transversely shifting the saddle and table.

The vertically adjustable sleeve 23 may be fixed or locked in its adjusted positions by clamping the ends of the column 20 together, the columns being partially split and provided with lugs or ears 56 and 57, through which the clamp bolts 58 extend, as clearly shown in Figure 15. The oscillatable sleeve 41 may be clamped in its adjusted positions by the vertical clamping bolt 200 threaded in the spindle housing 32 actuating a horizontally sliding locking pin 201 through engagement with a V-shaped notch 202 therein as shown in Figure 16. The bolt 200 has a wedge like face 203 cooperating with the inclined face 204 of notch 202 and as the clamping bolt 200 is threaded or actuated downwardly the said pin 201 is forced outwardly to frictionally engage the inside of the sleeve 23 and prevent relative movement between the members.

As noted above, the bed 15 is provided on its upper end with ways 16, which are V-shaped and adapted to interfit with similar V-shaped ways 59 formed in extension slides 60 and 61 of the saddle 17. The saddle 17 is adapted to be shifted on the ways aforesaid toward and from the spindle housing 32, and to this end is provided with a screw shaft 62 extending entirely through the saddle on one side thereof and through one of the extensions 60 and 61, and the shaft is provided on opposite ends with hand wheels 63 and 64. The screw shaft 62 is further provided intermediate its ends with screw threads 65, threadedly received in a nut 66 secured to the top plate 19 of the bed 15. From this, it will be noted that if either of the hand wheels 63 or 64 is rotated, the saddle 17 and table 18 carried thereby, together with the shaft 62, will be moved relative to the bed and toward or away from the spindle head 32 and column 20.

The saddle is provided, near its forward end, with a channel-like pocket 67, on the upper end of which is formed a peripheral flange 68 interfitting, but not contacting, with a similar flange on the table 18, to prevent foreign materials from entering the said pocket 67. The walls 69 and 70 of the channel 67 form bearings for freely rotatable idler shafts 71 and 72, which are each provided with ribbed rollers 73 and 74 interiorly of the said walls 69 and 70 but closely adjacent thereto. The rollers 73 and 74 are utilized for guiding roller bearing chains, which may extend partially around each roll and depend therefrom or the chains may be, as shown in Figure 12, endless chains extending about a pair of these rollers. The chains 75 and 76 may be supported intermediate the rollers 73 and 74 on a suitable guideway 77 extending upwardly from the base of the channel pocket 67. It should be noted that the bearing strip 77 is of the exact width intermediate the links connecting the individual rollers of the chain together, thereby forming an accurate guide strip for the chains. Also, the width of the ribs on the rollers 73 and 74 are of the same width as the guide strip 77 and accurately guide the chain in its movement about them.

The table 18 is provided on its under surface with tongues 79 and 80 in vertical alignment with the guiding strips 77 and are of exactly the same width and constitute the supporting surface upon which the table 18 bears in its reciprocating movement transversely of the bed. As the table 18 is shifted, the frictional contact between the tongues 79 and 80 and the rollers 81 of the chains 75 and 76 causes said rollers to rotate longitudinally of the bearing strips 77. This longitudinal movement causes a movement of the entire chain, whereby the rollers 73 and 74 assist in carrying the chains from one end of the channel pocket 67 to the other. The table 18 is further guided in its longitudinal movement by a guiding rack bar 82 depending centrally of the table. This rack bar has its side surfaces 83 and 84 very accurately machined and in engagement with anti-friction bearings 85 and 86 mounted on either side and at opposite ends thereof. The anti-friction bearings 86 are supported on stationary studs 87, while anti-friction bearings 85 are fastened by pins or the like 88 to arms 89 pivotable about pivots 90 carried by the base of the channel pocket 67. Each arm 89 has secured to its one end a compression spring 91, the other end of the spring being secured to a lug extending from the end of the channel 67. An adjustable stop 92 is provided, against which the arm is adapted to abut when moved beyond a certain limit in a direction against the yielding tension of spring 91. The yieldingly mounted anti-friction bearing 85 is adapted at all times to engage one face of the rack guide bar 82 and to take care of any slight inaccuracies that may exist on its surface 83 thereof. The stop 92 will prevent the inadvertent displacement of the table due to bumping against the table or other inadvertent pressure thereon in a direction toward the spindle housing 33. Movement of the table in a horizontal direction, away from the spindle housing 32 and column 20, is prevented by the stationary anti-friction bearing 86. It will be noted that no other guide means is provided for the table except the frictional gravity contact between the tongues 79 and 80 with the anti-friction rollers 81 and the aforesaid sides 83 and 84 of the guide rack bar 82 with the anti-friction bearings 85 and 86.

To prevent the table from being vertically lifted from its bearings or from tilting when the table is extended more than halfway beyond the end of the channel 67, the rack bar 82 has a lip 93 formed thereon which underlies the anti-friction bearings 86, as best seen in Figure 14.

The table may be manually shifted relative to the grinding wheel and spindle housing, by grasping any part thereof and exerting a light push thereon, or it may be fed past the grinding tools at a relatively rapid rate by manually operated means, or it may be very slowly fed past the said operating tools by manual means to be later described. The means for manually shifting the table at a relative rapid rate comprises a pinion 184 enmesh with the teeth of rack guide bar 82 at a point near the lefthand end of the table 18, as seen in Figures 12 and 14. This pinion 184 is carried by a shaft 185 slidably supported by a sleeve 186 which extends through a bearing 187 formed on the rear wall of the channel pocket 67. The shaft 185 is rotatable within and slidable through the sleeve 186 to engage and disengage the pinion with the teeth of the guide rack bar. A set screw extends through the bearing 187 into the sleeve 186 to prevent rotative and axial movement of the sleeve 186. The bearing 187 is further provided with a bore 189, in which a spring 190 is positioned which abuts on one end an adjusting screw 191 threaded into the bore 189 and on the other end abuts a ball plunger 192. The yielding ball plunger is adapted to co-operate with groove 193 and 194 formed circumferentially of the shaft 185 for locking the said shaft in either of its two positions. For rotating the shaft, it is further provided with a knob or hand wheel 195 secured to a reduced end thereof.

Figure 10:
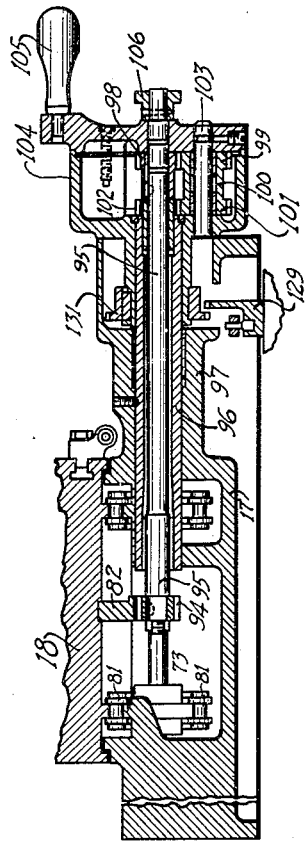
Figure 10 is a sectional view on line 10—10 of Figure 1, showing the manual means for manually shifting the table.

The manual means for very slowly feeding the table transversely of the saddle will now be described. Referring particularly to Figure 10, it will be noted that rack guide bar 82 meshes with a pinion 94 on shaft 95 rotatably supported by a sleeve 96 extending through a bearing 97 provided on the saddle 17. This shaft 95 has secured thereto a gear 98 enmesh with gear 99 of the double gear 100. The other gear 101 of double gear 100 is meshed with a gear 102 formed on the end of stationary sleeve 96. Double gear 100 is mounted to freely rotate about a pin 103 carried by hand wheel 104, which is provided with the usual handle 105. The shaft 95 is slidable through the fixed sleeve 96 and, as shown in Figure 10, is in position for manually slowly reciprocating the table 18. This is accomplished through the differential gearing just described, wherein the hand wheel 104 is rotated, carrying with it the double gear 100, and through the intermeshing of the gear 102 and gear 101 of double gear 100, said double gear 100 is rotated about pin 100. This rotation of the double gear 100 through the intermeshing of gears 99 of the said double gear 100 and gear 98 secured to shaft 95 effects the rotation of said shaft 95 at a very slow rate of speed. When it is desired to manually shift the table by merely grasping same and exerting a push thereon, it is necessary to axially shift the shaft 95 to the right, as seen in Figure 10, which can be accomplished by grasping the knob 106, pulling same outward and disengaging the teeth of pinion 94 from the teeth of rack guide bar 82. If the shaft 95 is left in the position shown in Figure 10, the table is locked against manual operation, except as described in connection with the manual operation thereof through the hand wheel 104 and when power reciprocating by the means now to be described.

It is sometimes desirable to power shift the table 18, and to this end the following mechanism is employed. The bed 15 is provided with an opening 107 in the front thereof, into which the power shift unit is placed. This power shift unit includes a base 108 for a motor 109, on the shaft of which is a worm 110 meshing with a worm wheel 111 fixed on driven shaft 112. Slidably mounted on primary shaft 112 is a threestep gear unit 113 having gears 114, 115 and 116 thereon. These gears are adapted to be respectively engaged with gears 117, 118 and 119 formed on sleeve 120 fixed to intermediate shaft 121. Gear 118 is constantly in mesh with a gear 122 on reverser shaft 123 for driving said shaft at a rate of speed depending upon which gears of the groups 113 and 120 are in mesh. Loosely mounted upon the reverse shaft 123 are a pair of beveled gears 124 and 125 meshing with a common similar beveled gear 126. Each of the gears 124 and 125 are provided with clutch teeth extending toward one another and adapted to be engaged by a sliding clutch spool 127 keyed to the reverse shaft 123 and adapted to rotate either of said gears therewith. The common beveled gear 126 has integrally formed therewith a spur gear 128 meshing with a slidable intermediate gear 129 loosely mounted on a stub shaft 130. Intermediate gear 129 is also adapted to be engaged with a pinion 131 keyed or otherwise secured to a sleeve 132 carried by the hand wheel 104. In order to connect the power drive with the shaft 95, it is necessary to shift intermediate gear 129 from the position shown in Figure 7, to the left into engagement with the pinion 131. It will be noted that gear 128 has a relatively wide face compared with the faces of gears 129 and 130. Also, gear 129 is provided with a groove 133 for receiving shifter fork 134 carried by starting lever 135 pivotally mounted on the top plate 19 of the bed 15. To control the direction of rotation of shaft 95, whether in a clockwise or counterclockwise direction, a reverse lever 136 is provided and adapted to be pivotally actuated about stud 137 and carries at the lower end a shifter finger 138 for engaging a tongue 140 extending from shifter fork 141 and sliding said fork longitudinally of slide bar 142. The shifter fork 141 is received in a groove 143 provided in the periphery of the shifter clutch 127 and controls the shifting thereof. To prevent inadvertent movement of the shifter fork and clutch, the shifter member 138 is provided with a detent plate 144 co-operating with a spring controlled detent 145. The shifting of the gear sleeve 113, to determine the speed of rotation of shaft 95 and movement of table 18, is controlled by shifter member 146, which has at one end a lock plunger 147 co-operating with stops 148 formed in the forward face of the bed. The lever 146 is secured to and adapted to be rotated about the shaft 149 which carries at its inner end a shifter arm 150 provided with a shoe 151 embracing the sides of the gear 115 on sliding gear sleeve 113. From this, it will be noted that by actuating the lever 146, the sleeve 113 may be shifted axially of the shaft 112 for disengaging gear 114 from gear 117 and engaging the other gear 115 with gear 118 or gear 116 with gear 119.

In the operation of the power shift mechanism, the shaft 95 would be positioned in the same position shown in Figure 10, whereupon the starting lever 135 would be actuated for shifting gear 129 into engagement with pinion 131. Depending on whether the table is to be shifted to the right or left, the reverse lever 136 would accordingly be actuated for connecting either beveled gear 124 or 125 with the reverser shaft 123 through the clutch 127. The proper speed would then be obtained by actuating shift lever 146 and engaging the proper gears on shafts 112 and 121.

In order to properly lubricate the bearings of the various rotating members of the power shift unit, there has been incorporated in this unit a force feed lubrication system, which is driven from the main drive shaft 112. To this end, shaft 112 is provided with eccentric 152, which engages and vertically depresses plunger 153 against the yielding resistance of spring 154. The chamber 155, in which the plunger 153 reciprocates, communicates with the interior of the power feed unit housing, which constitutes a reservoir for the lubricating oil through suitable valve control conduits and ducts. To this end, the pump housing 156 is provided with a conduit 157 communicating with the interior 158 of the housing 159, which constitutes the oil reservoir. Conduit 157 is connected by a passage 160 with the chamber 155, which passage is controlled by ball valve 161. Plunger 153 is provided with a central bore 162 adapted to be in connection with the chamber 155 when the plunger is depressed but which is closed off by valve 163 when the plunger is being returned to its normal position by the spring 154. Passage 160 communicates through duct 164 and conduit 165 to the various bearings where the lubricating oil is utilized.

In practice, this device may be utilized for performing various operations on various work pieces or tools, depending upon the desires or wishes of the operator. To this end, the machine may be equipped to perform plain cylindrical grinding, surface grinding or internal grinding. As illustrated in Figure 1, the machine is equipped to grind cylindrical work pieces or tools and is provided with a motor 166 on the lefthand end of the table, connected by means of a belt 167 with the head stock 168, all carried by the said table 18. At the other end of the table there is provided a suitable tailstock 169 for supporting a work piece between its center 170 and the driven portion 171 of the headstock 168. It is believed, from the foregoing description, that the operation of the improved machine will be thoroughly understood and in this connection it will be noted that there has been provided a hollow table, interiorly of which is a rotative or oscillative member, carrying at its upper end the spindle and grinding wheels and at its lower end the prime mover for said wheels. The grinding wheels and spindle may be vertically adjusted relative to the table carrying with it the prime mover, or the wheels may be placed at an angle to the normal, together with their prime mover, without binding or interfering with the drive thereof and at all times having an open straight drive. Also, it will be noted that a freely movable table is carried by the bed and may be manually or power actuated transversely of the grinding wheels for operation on the work carried thereby.

What is claimed is:

1. In a device of the class described the combination of a hollow bed, a column extending interiorly thereof, means for vertically adjusting the column relative to the bed, an oscillatable sleeve interiorly of the column and coaxial therewith, a spindle housing carried at the upper end of the sleeve, a spindle journaled in the housing, a prime mover carried by the lower end of the sleeve and within said bed, and means passing through the sleeve operatively connecting the prime mover with the spindle for actuation thereby.

2. In a device of the class described the combination of a support, a table carried thereby and overlying a certain portion thereof, anti-friction bearings intermediate the support and table for substantially the entire length of overlie and in diametrically opposed peripheral contact therewith, manual means for reciprocating the table at a relatively rapid rate, additional manual means for reciprocating the table at a relatively slow rate, and means for power reciprocating the table independently of the manual means therefor.

3. In a device of the class described the combination of a support, a table carried thereby and overlying a certain portion thereof, anti-friction bearings intermediate the support and table for substantially the entire length of overlie and in diametrically opposed peripheral contact therewith, manual means for reciprocating the table at a relatively rapid rate, additional manual means for reciprocating the table at a relatively slow rate, means for power reciprocating the table independently of the manual means therefor, means for varying the rate of power actuation of the table, and means for changing the direction of power reciprocation thereof.

4. In a cutter grinder the combination of a support, a table reciprocably carried by the support, the support underlying a certain portion of the table, anti-friction means intermediate the support and table and contacting the table and support throughout the entire distance of the overlie and in diametrically opposed peripheral contact therewith, a guide depending from the table, anti-friction bearings co-operating with the guide, and means carried by the guide co-operating with the last mentioned, anti-friction bearings for preventing vertical movement of the table relative to the support.

5. In a cutter grinder the combination of a support, a table reciprocably carried by the support, the support underlying a certain portion of the table, anti-friction means intermediate the support and table and contacting the table and support throughout the entire distance of the overlie and in diametrically opposed peripheral contact therewith, a guide depending from the table, anti-friction bearings co-operating with the guide, means carried by the guide co-operating with the last mentioned, anti-friction bearings for preventing vertical movement of the table relative to the support, and independent manual and power means for reciprocating the table on its support.

6. In a cutter grinder the combination of a fixed bed, a reciprocating table carried thereby, a grinding wheel carried by the bed above the table, independent manual and power means for reciprocating the table, the manual means comprising a pinion, a shaft carried thereby, a hand wheel, differential gearing intermediate the hand wheel and shaft for rotating the shaft, and a rack depending from the table enmesh with the pinion to be operated thereby, the power means comprising a prime mover, a worm driven thereby, and transmission gearing intermediate the worm and shaft for rotating same and the pinion connected thereto.

7. In a device of the class described the combination of a bed, a column carried by the bed and depending interiorly thereof, a reciprocating sleeve interiorly of the column, a second cylindrical sleeve interiorly of the reciprocating sleeve, the cylindrical sleeve being adapted to be oscillated relative to the reciprocating sleeve, a spindle housing carried by one end of the cylindrical sleeve, a prime mover carried by the other end of the cylindrical sleeve, means for vertically adjusting the prime mover relative to its supporting sleeve, transmission means extending between the prime mover and spindle housing for rotating the spindle carried thereby, and means for locking the reciprocating sleeve and oscillatable sleeve in adjusted positions.

8. In a device of the class described the combination of a fixed bed, a grinding wheel supported by the bed, means for vertically adjusting the grinding wheel relative to the bed, means for oscillating the grinding wheel relative to the bed, a saddle carried by the bed adapted to be reciprocated relative to the bed toward and from the grinding wheel, means controllable from both sides of the bed for reciprocating the saddle, a reciprocating table carried by the saddle and reciprocable transversely of the cutter tools, manual means operable from either side of the bed for manually shifting the table, and power means for automatically reciprocating the table independent of the manual means.

9. In a device of the class described the combination of a fixed bed, a grinding wheel supported by the bed, means for vertically adjusting the grinding wheel relative to the bed, means for oscillating the grinding wheel relative to the bed, a saddle carried by the bed adapted to be reciprocated relative to the bed toward and from the grinding wheel, means controllable from both sides of the bed for reciprocating the saddle, a reciprocating table carried by the saddle and reciprocable transversely of the grinding wheel, manual means operable from either side of the bed for manually shifting the table, power means for automatically reciprocating the table independent of the manual means, means for rendering the manual control means for the reciprocating table inoperative, and means for rendering the power reciprocating means inoperative.

10. In a machine of the class described the combination of a bed, a cylindrical sleeve mounted in the bed for axial and angular adjustment, a spindle housing carried by one end of the sleeve, a tool spindle journaled in the housing, means for effecting axial adjustment of the sleeve including a member extending parallel to the sleeve, translating mechanism operatively coupled to said member, manual actuating means for said mechanism, means for effecting angular adjustment of the sleeve, clamping means for securing the sleeve relative to the bed in adjusted position, a prime mover carried by the other end of the sleeve, and motion transmitting means coupling the prime mover to the spindle for selective actuation thereby at a plurality of speeds.

11. In a machine of the class described the combination of a bed, a cylindrical sleeve axially and rotatably mounted in the bed, a spindle housing carried by one end of the sleeve, a tool spindle journaled in the housing, means for effecting axial adjustment of the sleeve including a member extending parallel to the sleeve, translating mechanism operatively coupled to said member, manual means for actuating said mechanism, means for effecting angular adjustment of the sleeve, means to clamp the sleeve in angular or axial adjusted positions, a prime mover carried by the other end of the sleeve, a power transmitting band coupling the prime mover to the spindle for actuation thereby, and means to adjust the prime mover relative to the sleeve and thereby the spindle to vary the tension in the power transmitting band.

12. In a machine of the class described the combination of a bed, a tubular member reciprocably and rotatively mounted in the bed, a spindle housing carried by one end of the tubular member, a tool spindle journaled in the housing, means for effecting reciprocation of the sleeve to axially adjust the same, including a member extending parallel to the sleeve and operatively coupled therewith, translating mechanism for actuating said member to effect movement of the sleeve, manual actuating means for said mechanism, additional means for angularly adjusting the tubular member, means to clamp the tubular member in adjusted position, a carrier member adjustably mounted on the end of the tubular member for movement relative thereof, a prime mover attached to the carrier, a power transmitting band coupling the prime mover to the spindle, and manually actuated mechanism for adjusting the carrier member to vary the tension in the power transmitting band.

13. In a machine of the class described the combination of a bed, a cylindrical sleeve reciprocably and rotatably mounted in the bed, a spindle housing carried by one end of the sleeve, a spindle journaled in the housing, means for effecting vertical adjustment of the sleeve including a member extending parallel thereto, mechanism operatively coupled to said member, means to manually actuate said mechanism to thereby effect axial movement of the sleeve, additional means for effecting angular adjustment of the sleeve, clamping means for securing the sleeve against movement in any adjusted position, a slidable member adjustably mounted on the end of the sleeve opposite to the spindle, a prime mover secured to said member, a double cone pulley actuated by the prime mover, a power transmitting band extending from the pulley to the spindle, said pulley and belt being relatively shiftable to selectively determine the speed of rotation of the spindle, manually actuated mechanism for shifting said slidable member and thereby the pulley to determine the tension in said band, and means to lock the slidable member and parts carried thereby in adjusted position.

14. In a device of the class described the combination of a fixed bed, a grinding wheel supported by the bed, means for vertically adjusting the grinding wheel relative to the bed, means for oscillating the grinding wheel relative to the bed, a saddle carried by the bed, a reciprocating table carried by the saddle and reciprocable transversely of the grinding wheel, means to adjust the saddle to effect relative movement between the grinding wheel and table toward and from one another, manual means operable from either side of the bed for manually shifting the table, power means for automatically reciprocating the table independent of the manual means, and means for rendering the power reciprocating means inoperative.

15. In a device of the class described the combination of a fixed bed, a grinding wheel supported by the bed, means for vertically adjusting the grinding wheel relative to the bed, means for oscillating the grinding wheel relative to the bed, a saddle reciprocably mounted on the bed, a reciprocating table carried by the saddle and reciprocable transversely of the grinding wheel, means to reciprocate the saddle to effect relative adjustment between the grinding wheel and table toward and from one another, said means being selectively operable from the front and rear of the machine, manual means operable from one side of the bed for shifting the table, additional manual means operable from the other side of the bed for shifting the table, one of said manual means being coupled to the table to effect a relatively faster movement of the table for a predetermined movement thereof than the other of said manual means, and power means for automatically reciprocating the table.

16. In a machine of the class described, the combination of a hollow bed, a tool spindle, an oscillatable and axially movable column member mounted in the bed for supporting the spindle, an electric motor secured to the end of the column, transmission means extending through the column for coupling the motor to the spindle for actuation thereby, a work table, a saddle for supporting the table on the bed for relative movement with respect to the tool spindle, an electric motor carried by the saddle, a variable speed transmission mounted in the saddle for coupling the second named motor to the table, a work driving head carried by the table, and a third electric motor carried by the table for actuating said head whereby the tool spindle, the work head and the table may be operated independently of one another.

17. In a cutter grinder the combination of a hollow bed, a tool spindle, an oscillatable and axially movable column mounted in the bed for supporting the spindle, guideways formed on the top of the bed on opposite sides of the column, a saddle mounted on said guideways, a work table reciprocably mounted on the saddle and means carried by the saddle for effecting power translation of the table including a transmission housing depending from the underside of the saddle, a depression formed in the bed for receiving said housing, a change speed mechanism mounted interiorly of said housing, a prime mover mounted on the wall of said housing and operatively connected to the transmission, and rate and direction control means coupling the transmission to the table.

18. A cutter grinder having a hollow bed, a work table reciprocably mounted upon the bed, a tool spindle supported by the bed for transverse and angular adjustment, means to effect relative adjustment between the spindle and table toward and from one another, and means for effecting reciprocation of the table including a prime mover supported by the bed, a rack fixed to the table, a pinion rotatably supported in engagement with said rack, means coupling the prime mover to the pinion including a pair of parallel shafts, motion transmitting means coupling the prime mover to one of said shafts, a motion transmitting element shiftable to a plurality of different positions for connecting said shafts in a plurality of different speed ratios, a shiftable member operatively coupled with the final parallel shaft, means effective upon shifting of said member in one direction to positively connect the pinion for rotation by said final shaft, and means in said transmission for determining the direction of movement of the table.

19. A cutter grinder having a hollow bed, a work table reciprocably mounted upon the bed, a tool spindle supported by the bed for transverse and angular adjustment, means to effect relative adjustment between the spindle and table toward and from one another, and means for effecting reciprocation of the table including a prime mover supported by the bed, a rack fixed to the table, a pinion rotatably supported in engagement with said rack, means coupling the prime mover to the pinion including a pair of parallel shafts, motion transmitting means coupling the prime mover to one of said shafts, a motion transmitting element shiftably to a plurality of different positions for connecting said shafts in a plurality of different speed ratios, a shiftable member operatively connected with the final parallel shaft, means effective upon shifting of said member in one direction to positively connect the pinion for rotation by said final shaft, means in said transmission for determining the direction of movement of the table, manually actuable means for rotating said pinion, and means for shifting said member to an inoperative position and thereby disconnect the prime mover from the pinion whereby the table may be manually actuated.

20. In a machine of the class described the combination of a bed, said bed having a cylindrical bore formed interiorly thereof, an oscillatable and axially movable sleeve mounted in said bore, a spindle housing carried at the upper end of the sleeve, a prime mover carried at the lower end of the sleeve, a power transmitting band extending from the prime mover to the spindle for effecting rotation thereof, and means for adjusting the motor toward and from the spindle including a motor support, and rack and pinion means between the support and the end of said sleeve.

21. In a machine of the class described the combination of a bed, a cylindrical sleeve reciprocably and rotatably mounted in the bed, a spindle housing carried by one end of the sleeve, a spindle journaled in the housing, means for effecting vertical adjustment of the sleeve including a member extending parallel thereto, manually operable mechanism for actuating said member, additional manually actuable mechanism for effecting angular adjustment of the sleeve, clamping means for securing the sleeve against movement in either direction of adjustment, a bracket mounted on the end of the sleeve opposite to the spindle for movement in a direction parallel to the axis of said sleeve, a prime mover mounted on the bracket, a double cone pulley actuated by the prime mover, a power transmitting band extending from the pulley to the spindle, said band being adapted to cooperate with either cone on the pulley to vary the speed of the spindle, rack and pinion mechanism for adjusting said bracket and thereby the motor to tighten the belt in accordance with the cone of the pulley being utilized, and means to clamp the bracket to the end of the sleeve to maintain the parts in adjusted position.

HERMAN R. ISLER.
SOL EINSTEIN.